United States Patent [19]

Abadié

[11] 4,051,413
[45] Sept. 27, 1977

[54] TRANSISTORIZED STATIC INVERTERS

[76] Inventor: Henry J. L. Abadié, "Le Château", 65140 Monfaucon, France

[21] Appl. No.: 690,355

[22] Filed: May 26, 1976

[51] Int. Cl.² .................. H02M 7/48; H05B 41/29
[52] U.S. Cl. ........................ 315/219; 315/209 R; 315/324; 315/DIG. 7; 331/113 A
[58] Field of Search .............. 315/209 R, 219, 312, 315/324, DIG. 7; 331/62, 113 A; 321/14, 44, 45 R

[56] References Cited
U.S. PATENT DOCUMENTS

| 3,083,326 | 3/1963 | Deming et al. | 331/113 A X |
|---|---|---|---|
| 3,453,520 | 7/1969 | Mas | 331/113 A X |
| 3,579,026 | 5/1971 | Paget | 331/113 A X |
| 3,829,794 | 8/1974 | Gautherin | 331/113 A |

Primary Examiner—Eugene R. LaRoche
Attorney, Agent, or Firm—Larson, Taylor and Hinds

[57] ABSTRACT

A static inverter comprises switching transistors, resistors connecting the bases of the transistors with a junction point connected to a source of DC voltage. The bases of the transistor are inductively coupled by inductance means coupled with coils connecting the collectors of the transistors to the junction. The inverter is adapted to operate a plurality of fluorescent lamps. Each lamp is in series with the secondary of a transformer whose primary is connected across the collectors of the transistors.

8 Claims, 6 Drawing Figures

TRANSISTORIZED STATIC INVERTERS

BACKGROUND AND SUMMARY OF THE INVENTION

This invention relates to improvements in transistorized static inverters for converting direct voltage into alternating voltage and supplying energy to an output load. The invention is particularly adapted for operating fluorescent lamps, although loads of other types, such as integrated circuits, are also acceptable.

Transistorized inverters, frequently designated "electronic ballast" are broadly used for operating fluorescent lamps. Examples of such inverters are disclosed in U.S. Pat. No. 3,219,946 (Compoly), Nos. 3,448,370 (Harrigan), and 3,500,168 (Merritt), as well as in French patent specifications 2,165,037 and 1,359,664. Most of the existing inverters have substantial drawbacks. They are not suitable for operating loads which require an output power which may vary within broad limits while correctly operating within the complete range. However, such conditions are frequently encountered. For instance, when an inverter is used for operating a plurality of fluorescent lamps, some of the lamps may be cut off or failed. Also, most static inverters are so constructed that their transistors are destructed if a short-circuit should develop across the output of the inverter. For overcoming that difficulty, U.S. Pat. No. 3,219,946 suggests a circuit having a voltage divider network which tends to reduce the bias voltage of the transistors upon occurence of a short-circuited output condition. That network and the associated coils may be considered as analogous to a pilot circuit. It does not however permit satisfactory operation under highly variable output conditions and particularly highly variable output current values.

It is an object of the invention to provide a transistorized static inverter which permits operation under highly variable output conditions.

It is an other object of the invention to provide a static inverter for simultaneously operating a plurality of loads, and particularly of fluorescent lamps, while allowing for simultaneous adjustment of the RMS voltage and frequency applied to all loads.

For that purpose, there is provided a static inverter comprising:

a. a first and a second switching transistors each having emitter, collector and base, b. a first resistor and a second resistor respectively connecting the bases of said first and second transistors to a junction point and operating as current generator for said transistors, c. a source of DC voltage connected to said junction point, d. inductance means inductively coupling said bases, e. first and second coils inductively coupled to said inductance means and respectively connecting the collectors of said transistors to said junction, f. capacitor means connecting said collectors, said capacitor means, coils and inductance means constituting a frequency pilot circuit for said transistors, g. first and second switching rectifier means connecting the collectors of said transistors to ground for uncoupling said collectors, h. and at least one output transformer, each said transformer having a primary connected across said collectors and a secondary whose ends constitute terminals for connection of an output load.

Self-inductance coil means may preferably be connected in series between the junction and the DC source. That self-inductance should then have an impedance high enough for impedance matching of the source and the transistor circuit, that is a value which is much higher than that of the filter coils which have sometimes been used.

The invention may be used for operating fluorescent lamps at a frequency which may be as high as 200 kHz and is adjustable by modifying the number of turns of the coils of the pilot circuit. PNP transistors may be substituted for NPN transistors, subject to polarity changes.

In a particular embodiment of the invention, each primary consists of two identical windings connected in series relation, electric conductor means connecting the common ends of said windings to said junction and respective rectifier means connecting said collectors to the remaining ends of said windings.

SHORT DESCRIPTION OF THE DRAWINGS

DESCRIPTION OF PREFERRED EMBODIMENT

Figure 1:
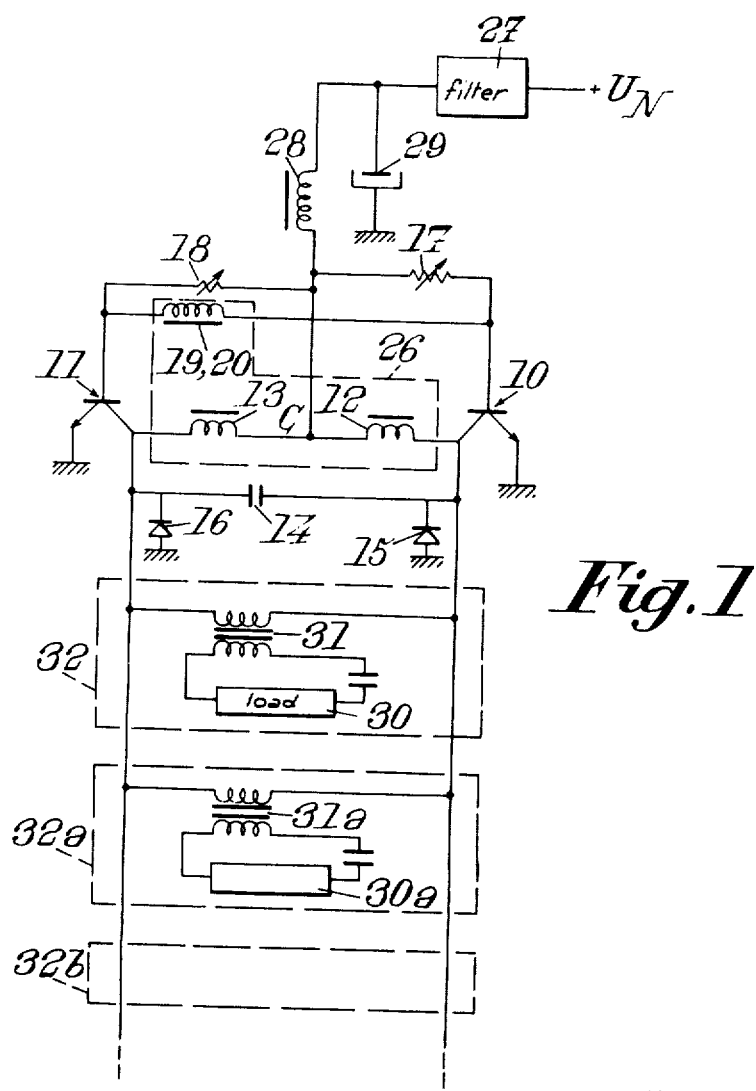
FIGS. 1, 2 and 3 are schematic diagrams of an inverter constructed according to the principles of the invention and of two modified embodiments.

Referring to FIG. 1, the inverter circuit comprises two NPN transistors 10 and 11 having emitter, collector and base electrodes. The emitters of the transistors are grounded. A series circuit of two coils 12, 13 carried by a core of magnetic material connect the collectors of transistors 10 and 11. The collectors are also connected by a coupling capacitor 14. Switching diodes 15 and 16 are located between the collectors of respective transistors and the ground.

The bases of transistors 10 and 11 are connected by respective resistors 17 and 18 to the junction C of the coils 12 and 13. That junction is also connected to a DC power supply providing a voltage $U_N$. Resistors 17 and 18 operate as base current generators, while inductance means carried by the magnetic core and coupled by the core with the coils 12 and 13 operate as base voltage generator. The inductance means 19, 20 may be formed as a single inductance coil. Coils 12, 13, 19, 20 constitute a frequency pilot circuit 26.

The embodiment of FIG. 1 comprises an input cell for impedance matching. That cell consists of a self-inductance 28 (generally a coil wound on a ferrite core) and a capacitor 29. The self inductance is given a value which is sufficient for providing uncoupling between the source and the inverter portion of the circuit. While capacitor 29 (typically some microfarads) is not essential, it provides more satisfactory results. A filter 27 (L circuit for instance) is advantageously inserted in series between the self-inductance 28 and the source for protecting the source against the alternating voltage generated by the inverter. The self inductance coil 28 exerts a protection effect which is not negligible and complements that of filter 27.

The circuit is adapted to deliver an output voltage across the collectors of transistors 10 and 11. That voltage is substantially a sine-wave alternating voltage having an amplitude which is slightly lower than 3 $U_N$. The frequency of that voltage is a function of the value of capacitor 14 and of the number of turns of coils 12 and 13.

The inverter is adapted to operate correctly and without damage even if there is no load. On the other hand, in most prior art inverters, the removal or failure of an output load results in destruction of one of the transistors after some minutes of operation, since the collector-emitter voltage $V_{CE}$ exceeds $V_{CEO}$ at each half-wave. Each of the loads to be supplied is connected in series with the secondary of a respective transformer whose primary is connected across the collectors of transistors 10 and 11. In the embodiment of FIG. 1, two fluorescent lamps 30 and 30a are provided, each operated by a respective transformer 31 and 31a. Any number of units 32, 32a, 32b consisting of a transformer and a load may be supplied, as long as the dissipating power of transistors 10 and 11 is not exceeded.

A number of advantages provided by the invention result from that type of operation:

- since the frequency pilot circuit 26 may have a magnetic core of small size, much smaller than the size of the transformer core, the inverter may be miniaturized,
- since each transformer is independent from the other transformers, anyone of the load circuit may be opened without detrimentally affecting the operation of the complete system,
- since the transistors are controlled by the pilot circuit, the inverter may be left in stand-by condition without any load, i.e. either without any transformer or with transformers whose secondary is open. Then the only limitation consists in the insulating capacity between the wires of the secondaries of the transformers in open circuit,
- the frequency may be modified within the range which is rendered available by the nature of the magnetic circuits, without altering the transformer,
- the RMS voltage at the output of one or more transformers may be modified using a single inverter which may be at a distance from the transformers.

One of the parameters which limit the power that the inverter of FIG. 1 may deliver, consists of the dissipating power of the resistors 17 and 18 which operate as current generators and whose value should be all the more lower (for predetermined transistors) as the output power to be delivered is higher. Typically, as soon as the output power should exceed 100 watts for a supply voltage $U_N = 28$ Volts, the power dissipated by the resistors is so high that the surrounding circuits are brought to a temperature which may become excessive.

Figure 2:
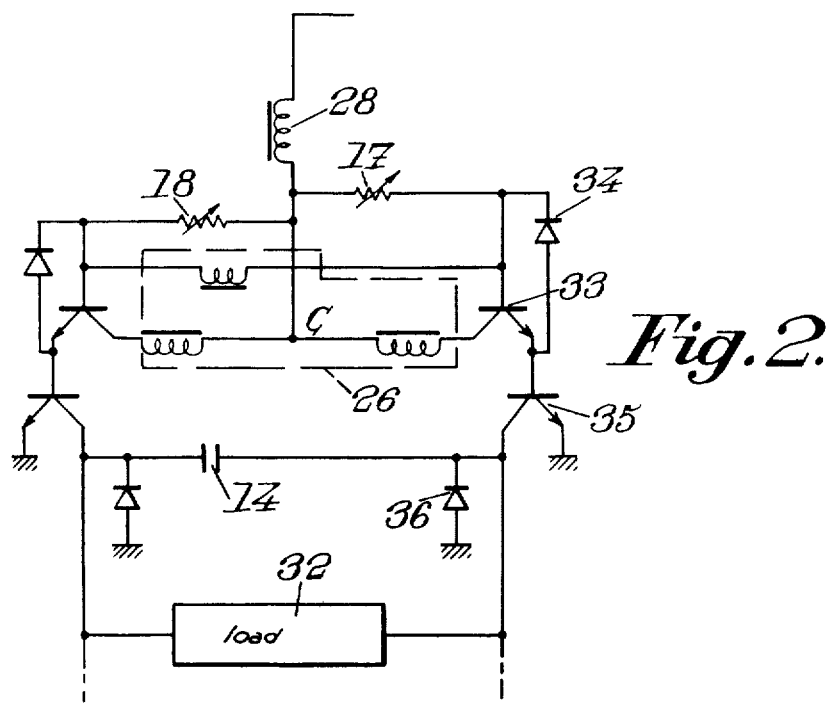

That limitation is overcome if each switching transistor is substituted with cascaded transistors, the first of which drives the other. Referring to FIG. 2 (where the elements corresponding to those illustrated in FIG. 1 are designated by the same reference numerals for more clarity) each switching transistor is substituted with a Darlington circuit. For instance, transistor 10 is replaced with a first transistor 33 whose emitter is connected to its base by a switching diode 34 and is directly connected to the base of the power transistor 35. The collector of transistor 35 is grounded by a switching diode 36 and is connected to the collector of the other transistor by capacitor 14. The output load circuits are again connected across the collectors of the transistors. As an example, a load which requires two resistors of 1 Kohm dissipating 4 watts in the embodiment of FIG. 1 may be supplied using two resistors 17 and 18 of 22 Kohm dissipating 0.5 watt in the embodiment of FIG. 2.

Figure 3:
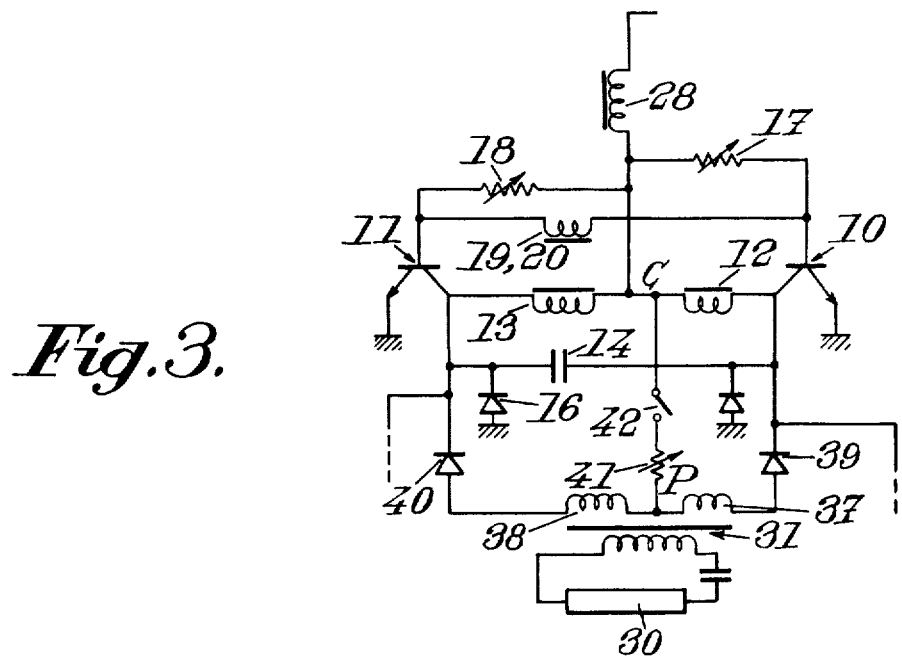

An other approach for delivering an increased output power is illustrated in FIG. 3. On FIG. 3, the elements corresponding to those of FIGS. 1 and 2 are again designated by the same reference numerals. While in the embodiment of FIG. 1 the primary of transformer 31 consists of a single coil connected across the collectors of transistors 10 and 11, in FIG. 3, there are two coils 37 and 38 which are serially connected and whose junction P is connected to junction C for direct supply of the coils 37 and 38. Rectifiers in the form of solid state diodes 39 and 40 are then located between coils 37 and 38 and the collectors of the corresponding transistors 10 and 11.

In the embodiment of FIG. 3, a manually adjustable resistor 41 and a switch 42 are located in series between junctions P and C. Resistor 41 may be operated for adjusting the RMS voltage across the secondary of transformer 31.

As in the embodiment of FIG. 1, the inverter of FIG. 3 is typically used for operating a plurality of transformers each having a load consisting of a fluorescent lamp or an integrated circuit.

Figure 4:
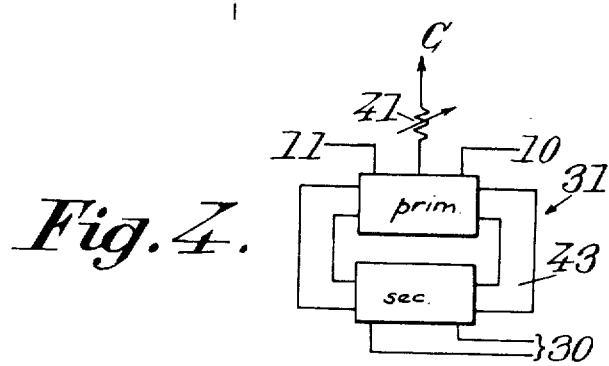
FIG. 4 is a schematic diagram of a possible arrangement of one of the transformers in FIG. 3.

Transformer 31 may be of the type indicated on FIG. 4. A ferrite core (typically a L-shaped ferrite core) carries the secondary connected to load 30 and a primary having a mid-terminal which is connected to junction C.

Figure 5:
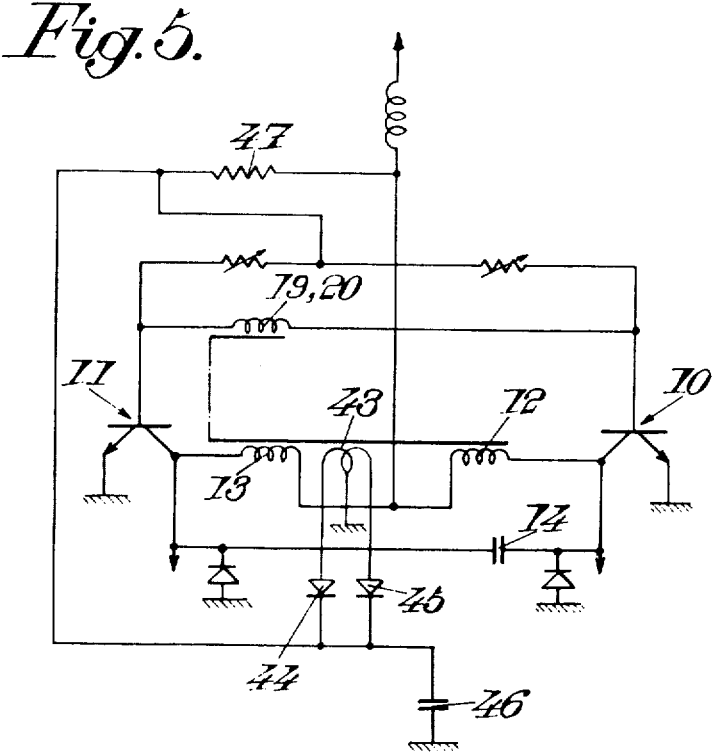
FIG. 5 is a schematic diagram illustrating another modified embodiment.

In still another modified embodiment of the invention, illustrated on FIG. 5, the problem of power dissipation by the base current generating resistors, when heavy currents are required for the load, is tackled with in another way. An auxiliary current generator is provided and consists of a few turns of wire 43 wound on the magnetic circuit of the frequency pilot unit. Typically six turns are provided. The ends of the coil consisting of the six turns are connected to ground via respective diodes 44 and 45 and a common capacitor 46 in series with the diodes. A mid section port of the coil 43 is grounded. The junction between diodes 44, 45 and capacitor 46 is connected to junction C via a resistor 47. Contrary to the embodiment of FIG. 1, the junction between resistors 18 and 17 is not connected to junction C, but rather to capacitor 46 and diodes 44, 45. With such an arrangement and a 28 Volts DC source, an output power as above may be obtained with an RMS voltage of 2 Volts using resistors 17 and 18 adapted to dissipate 0.5 watt only.

Figure 6:
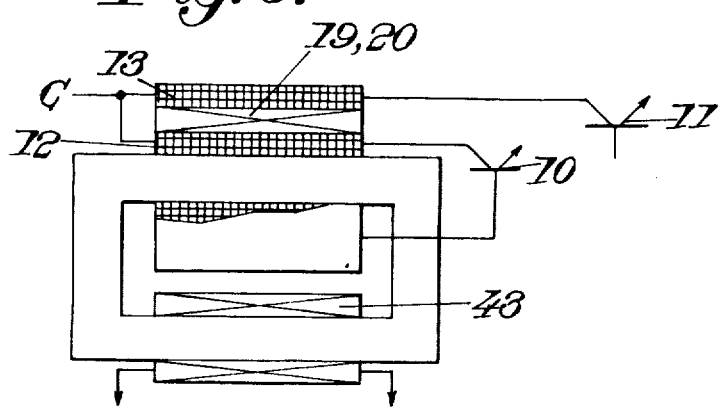
FIG. 6 shows a possible arrangement of various components of the inverter.

The coils diagrammatically illustrated in FIG. 1 or 5 may be arranged on a common magnetic coil as indicated on FIG. 6. A common magnetic circuit 48 supports coil 12 connected to transistor 10, coils 19 and 20 (which in fact consist of a single winding surrounding coil 12), and coil 13 connected to transistor 11. That arrangement makes it possible to use a winding 19, 20 having an uneven number of coils, thereby it is possible to have an adjustment of each coil 19 and 20 by half-turns. If required, coil 43 may be carried on the other arm of the magnetic circuit 48.

The coils may be as indicated in French U.S. Pat. No. application No. EN 74 32214 (Jean BENQUEY et al) published in print under No. 2286542.

I claim:
1. A static inverter for converting direct voltage into alternating voltage, comprising:
   a. a first and a second switching transistors each having emitter, collector and base, b. a first resistor and a second resistor respectively connecting the bases of said first and second transistors to a junction point and operating as current generator for said transistors, c. a source of DC voltage connected to said junction point, d. inductance means inductively coupling said bases, e. first and second coils inductively coupled to said inductance means and respectively connecting the collectors of said transistors to said junction, f. capacitor means connecting said collectors, said capacitor means, coils and inductance means constituting a frequency pilot circuit for said transistors, g. first and second switching rectifier means connecting the collectors of said transistors to ground for uncoupling said collectors, h. and at least one output transformer, each said transformer having a primary connected across said collectors and a secondary whose ends constitute terminals for connection of an output load.

2. An inverter according to claim 1, comprising self-inductance coil means connected in series between said junction and said source, said self-inductance coil means having an impedance high enough for impedance matching of the source and transistor circuit.

3. An inverter according to claim 1, further comprising power transistors connected to said switching transistors to be driven by said switching transistors, said primaries being connected across the collectors of said power transistors.

4. An inverter according to claim 1, wherein each said primary consists of two identical windings connected in series relation, electric conductor means connecting the common ends of said windings to said junction and respective rectifier means connecting said collectors to the remaining ends of said windings.

5. An inverter according to claim 4, further including attenuator means interposed on said conductor means.

6. A static inverter for converting direct voltage into alternating voltage, comprising:

a. a first and a second switching transistors each having emitter, collector and base, b. a first resistor and a second resistor respectively connecting the bases of said first and second transistors to a junction point and operating as current generator for said transistors, c. a source of DC voltage connected to said junction point, via a series arrangement of a resistor and of self inductance coil means, d. inductance means inductively coupling said bases, e. first and second coils inductively coupled to said inductance means and respectively connecting the collectors of said transistors to said source, via said self inductance coil means, f. capacitor means connecting said collectors, said capacitor means, coils and inductance means constituting a frequency pilot circuit for said transistors, g. first and second switching rectifier means connecting the collectors of said transistors to ground for uncoupling said collectors, h. a capacitor having a first armature connected to said junction and another armature grounded, i. a winding inductively coupled to said inductance means and having a grounded mid terminal and end terminals, j. unidirectional conduction means connecting said end terminals to said first armature to form a voltage generator for said transistors, k. and at least one output transformer, each said transformer having a primary connected across said collectors and a secondary whose ends constitute terminals for connection of an output load.

7. A static inverter for operating a plurality of fluorescent lamps from a direct voltage current source, said inverter comprising:

a. a first and a second switching transistors each having emitter, collector and base, b. a first resistor and a second resistor respectively connecting the bases of said first and second transistors to a junction point and operating as current generator for said transistors, c. self inductance coil means connected in series between said junction and said source, said self inductance coil means having an impedance high enough for impedance matching of the source and transistor circuit, d. inductance means inductively coupling said bases, e. first and second coils inductively coupled to said inductance means and each connecting the collector of a respective one of said transistors to said junction, f. capacitor means connecting said collectors, said capacitor means, coils and inductance means constituting a frequency pilot circuit for said transistors, g. first and second switching rectifier means connecting the collectors of said transistors to ground for uncoupling said collectors, h. and a plurality of output transformers each for operating a fluorescent lamp and each having a primary connected across said collectors and a secondary whose ends constitute terminals for connection of the fluorescent lamp.

8. A static inverter according to claim 7, further comprising:

a supplemental resistor located between the common terminal of said first and second resistors and said junction point, supplemental capacitor means connecting said common terminal to ground, an auxiliary coil having a central grounded tap and inductively coupled with said inductance means and first and second coils, and unidirectional conduction means respectively connecting the ends of said auxiliary coil means to said common terminal, the above-mentioned elements being arranged and dimensioned for constituting an additional base current generator for said transistors, whereby an increased output AC current may be delivered.

* * * * *